United States Patent
Yang

(10) Patent No.: US 7,349,229 B1
(45) Date of Patent: Mar. 25, 2008

(54) CAUSAL SAMPLING CIRCUIT FOR MEASURING REFLECTED VOLTAGE AND DEMAGNETIZING TIME OF TRANSFORMER

(75) Inventor: Ta-Yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 11/613,884

(22) Filed: Dec. 20, 2006

(51) Int. Cl.
*H02M 3/335* (2006.01)
(52) U.S. Cl. .............................. 363/21.16; 323/21.13; 323/21.18; 323/97
(58) Field of Classification Search ............. 363/21.05, 363/21.16, 21.08, 21.09, 21.1, 21.13, 21.17, 363/21.18, 97, 131
See application file for complete search history.

(56) References Cited

U.S. PATENT DOCUMENTS

| | | | |
|---|---|---|---|
| 4,302,803 A | 11/1981 | Shelly | |
| 6,853,563 B1 | 2/2005 | Yang et al. | |
| 6,862,194 B2 * | 3/2005 | Yang et al. | 363/16 |
| 7,016,204 B2 | 3/2006 | Yang et al. | |
| 7,057,907 B2 * | 6/2006 | Oh | 363/21.05 |
| 2007/0103943 A1 * | 5/2007 | Mangtani et al. | 363/20 |
| 2007/0133234 A1 * | 6/2007 | Huynh et al. | 363/20 |

* cited by examiner

*Primary Examiner*—Gary L. Laxton
(74) *Attorney, Agent, or Firm*—J.C. Patents

(57) ABSTRACT

A causal sampling circuit is developed to measure a reflected voltage and demagnetizing time of the transformer. It includes a signal-generation circuit to generate a sample signal for sampling the reflected voltage of the transformer. A ramp signal of the sampling circuit is generated in response to the demagnetizing of the transformer. A first reference signal is generated in accordance with the magnitude of the ramp signal after the transformer is fully demagnetized. A second reference signal is generated in response to the ramp signal and a bias signal. The sample signal is enabled in response to the demagnetizing of the transformer. The sample signal is disabled once the second reference signal is higher than the first reference signal. A sample-and-hold circuit is coupled to the transformer to sample the reflected voltage of the transformer in response to the sample signal.

12 Claims, 4 Drawing Sheets

US 7,349,229 B1

CAUSAL SAMPLING CIRCUIT FOR MEASURING REFLECTED VOLTAGE AND DEMAGNETIZING TIME OF TRANSFORMER

BACKGROUND OF THE INVENTION

1. Field of the Invention

The present invention relates to a power converter, and more specifically, relates to a control circuit of switching power converter.

2. Description of Related Art

Power supplies have been widely used to provide regulated output voltages. For safety, an off-line power supply must provide isolation between its primary side and secondary side. An optical-coupler and a secondary-side regulator are needed to regulate the output voltage of the off-line power supply. In order to reduce the device counts and the secondary-side feedback circuit, the reflected voltage of the transformer has been utilized to regulate the output voltage of the power supply, for example, "Rectifier-converter power supply with multi-channel flyback inverter", by Randolph D. W. Shelly, U.S. Pat. No. 4,302,803. However, this skill cannot measure an accuracy voltage signal from the transformer, which causes a poor regulation of the power converter. Therefore, many primary-side control techniques are developed recently for providing a precise voltage measurement to the transformer, such as "Primary-side controlled flyback power converter" by Yang, et al, U.S. Pat. No. 6,853,563; "Close-loop PWM controller for primary-side controlled power converters" by Yang, et al, U.S. Pat. No. 7,016,204. However, the detection circuits of these prior arts are complicated, which increase the cost of power supply. How to overcome these shortcomings are the main object of the present invention.

SUMMARY OF THE INVENTION

An object of the present invention is to provide a simple and precise sampling circuit to measure a reflected voltage of the transformer.

The sampling circuit includes a signal-generation circuit and a sample-and-hold circuit. The signal-generation circuit is utilized to generate a sample signal for sampling the reflected voltage of the transformer. Firstly, the signal-generation circuit will generate a ramp signal in response to the demagnetizing of the transformer. Then, a first reference signal is produced in accordance with the magnitude of the ramp signal once the transformer is fully demagnetized. A second reference signal is further generated in response to the ramp signal and a bias signal. The sample-and-hold circuit is coupled to the transformer to generate a voltage signal by sampling the reflected voltage of the transformer in response to the sample signal. The voltage signal is correlated to the output voltage of the power converter. The sample signal is enabled in response to the demagnetizing of the transformer. The sample signal is disabled once the second reference signal is higher than the first reference signal. The sampling circuit of the present invention further includes a timing circuit to generate a discharge-time signal representing the demagnetizing time of the transformer. The discharge-time signal is enabled in response to the demagnetizing of the transformer. The discharge-time signal is disabled once the magnitude of a third reference signal is lower than the voltage signal. The third reference signal is correlated to the reflected voltage of the transformer and an offset signal.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF THE PREFERRED EMBODIMENTS

Figure 1:
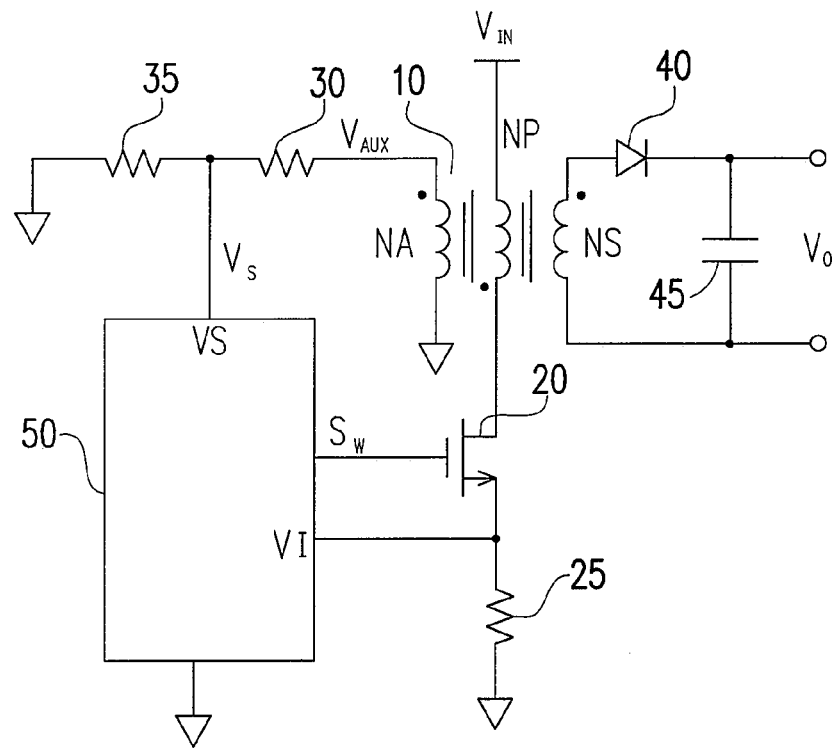
FIG. 1 shows a schematic diagram of a power converter.

FIG. 1 shows a switching power converter which comprises a transformer 10 having an auxiliary winding NA, a primary winding NP, and a secondary winding NS. The primary winding NP is coupled to an input voltage $V_{IN}$. The secondary winding NS generates an output voltage $V_O$ via a rectifier 40 and a capacitor 45. In order to regulate the output voltage $V_O$, a switching control circuit 50 generates a switching signal $S_W$ to switch the transformer 10 via a transistor 20. When the transistor 20 is turned on, the input voltage $V_{IN}$ is applied to magnetize the transformer 10. A charge current therefore flows through the primary winding NP of the transformer 10 and the transistor 20. Through a resistive device 25, the charge current is converted to a current signal coupled to a VI terminal of the switching control circuit 50. Once the switching signal $S_W$ is disabled and the transistor 20 is turned off, the demagnetizing of the transformer 10 is started. The energy stored into the transformer 10 is delivered to the secondary winding NS and the auxiliary winding NA during the demagnetizing of the transformer 10. Therefore, the enable of the switching signal $S_W$ represents magnetizing the transformer 10; the disable of the switching signal $S_W$ represents the start of demagnetizing the transformer 10. If the forward voltage of the rectifier 40 can be neglected, the reflected voltage $V_{AUX}$ of the auxiliary winding NA can be expressed as:

$$V_{AUX} = \frac{N_A}{N_S} \times V_O \qquad (1)$$

where $N_A$ and $N_S$ are respectively the winding turns of the auxiliary winding NA and the secondary winding NS of the transformer 10.

A voltage divider formed by resistors 30 and 35 is connected to a VS terminal of the switching control circuit 50 to detect the reflected voltage $V_{AUX}$ of the auxiliary winding NA of the transformer 10. The voltage $V_S$ detected at the VS terminal of the switching control circuit 50 can be shown as:

$$V_S = \frac{R_{35}}{R_{30} + R_{35}} \times V_{AUX} \quad (2)$$

where $R_{30}$ and $R_{35}$ are respectively the resistance of resistors 30 and 35. In order to precisely detect the output voltage $V_O$ of the power converter, the reflected voltage $V_{AUX}$ should be measured when the switching current of the secondary winding NS is reduced to zero. Therefore, the variation of the forward voltage of the rectifier 40 can be neglected.

Figure 2:
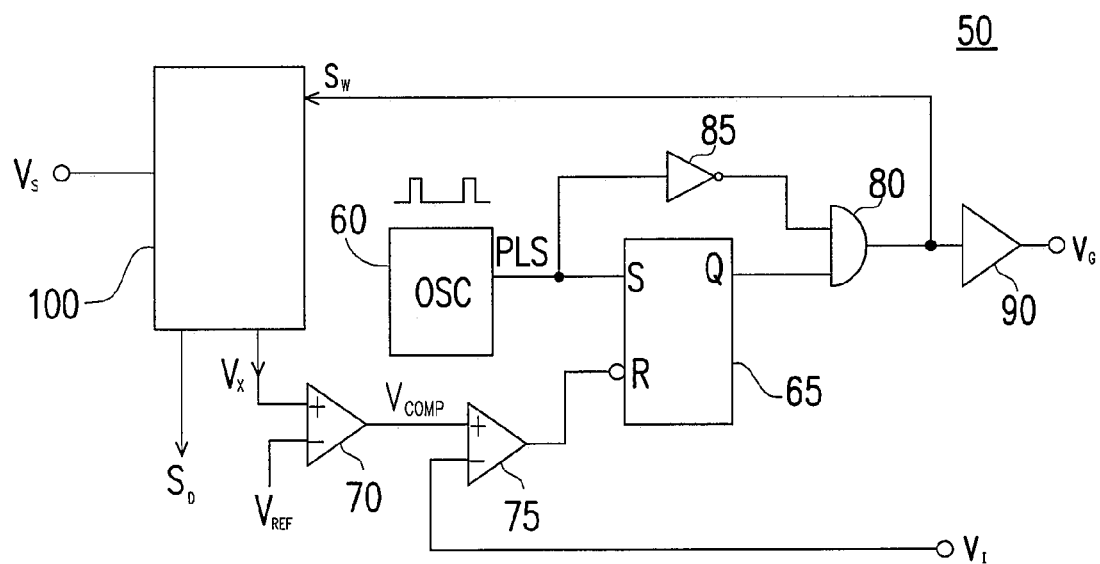
FIG. 2 shows a switching control circuit of the power converter in accordance with the present invention.

FIG. 2 shows the switching control circuit 50 shown in FIG. 1. It includes a sampling circuit 100 coupled to the VS terminal to generate a voltage signal $V_X$ in accordance with the reflected voltage $V_{AUX}$ detected from the transformer 10. The voltage signal $V_X$ is input to an error amplifier 70. The error amplifier 70 includes a reference voltage $V_{REF}$. An oscillation circuit 60 generates a pulse signal PLS to enable a flip-flop 65 periodically. The output of the flip-flop 65 is connected to an input of an AND gate 80 for generating the switching signal $S_W$. If it is necessary, the output switching signal $S_W$ may be transformed into the signal $V_G$ to drive the transistor 20 via the driver 90. Another input of the AND gate 80 is connected to the pulse signal PLS through an inverter 85. The output of the error amplifier 70 is connected to an input of a comparator 75. Another input of the comparator 75 is coupled to the VI terminal to receive the current signal. The output of the comparator 75 is coupled to the flip-flop 65 for resetting the flip-flop 65 when a voltage level of the current signal at the VI terminal is higher than a voltage signal $V_{comp}$. The voltage signal $V_{comp}$ is generated by the error amplifier 70.

Figure 3:
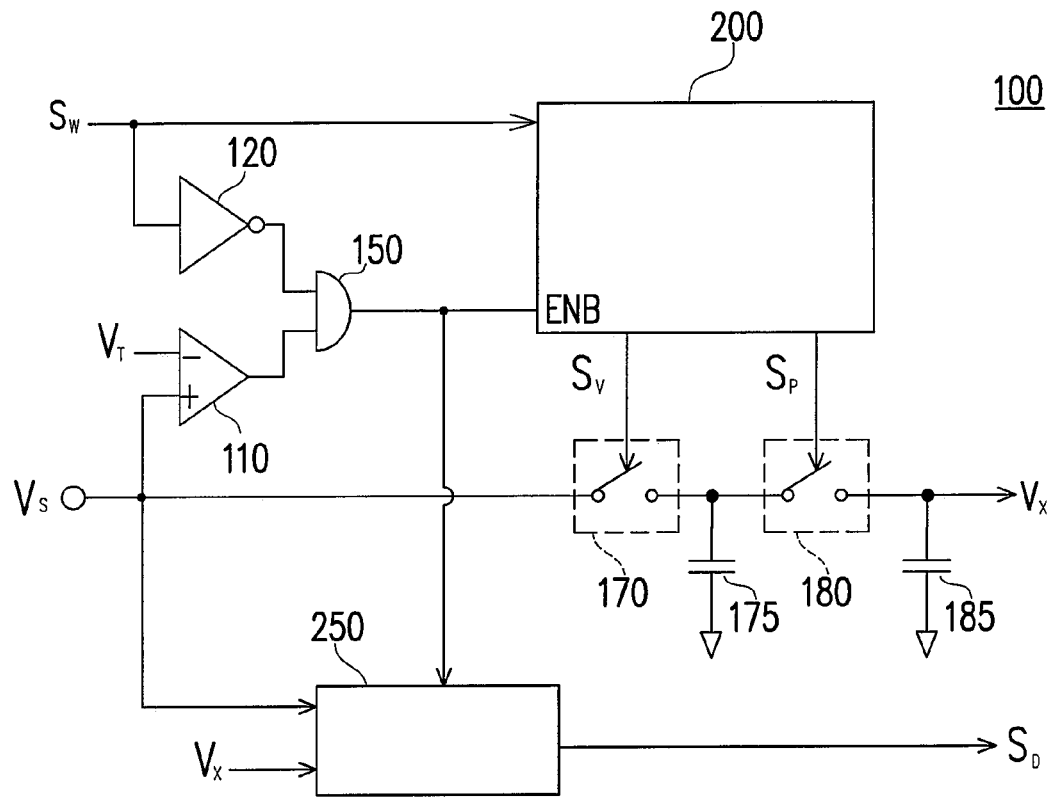
FIG. 3 shows a preferred embodiment of a sampling circuit according to the present invention.

FIG. 3 shows the sampling circuit 100 shown in FIG. 2. A signal-generation circuit 200 is utilized to generate a sample signal $S_V$ in response to a time-frame signal ENB and the switching signal $S_W$. Furthermore, a hold signal $S_P$ is generated by the signal-generation circuit 200 in response to the disabling of the sample signal $S_V$. A comparison circuit includes a comparator 110, an inverter 120, an AND gate 150 and a threshold voltage $V_T$. The comparison circuit is utilized to generate the time-frame signal ENB in response to the voltage $V_S$, correlated to the reflected voltage $V_{AUX}$ of the transformer 10. The input of the comparator 110 is coupled to the VS terminal to receive a voltage Vs from the reflected voltage $V_{AUX}$ in correlation according to Eq. (2). The threshold voltage $V_T$ is connected to another input of the comparator 110. The output of the comparator 110 is connected to the input of the AND gate 150. Another input of the AND gate 150 is connected to receive the switching signal $S_W$ through the inverter 120. Therefore, the time-frame signal ENB is enabled in response to the disable of the switching signal $S_W$. The time-frame signal ENB is disabled when the voltage at terminal VS is lower than the threshold voltage $V_T$.

Switches 170, 180 and capacitors 175, 185 develop a sample-and-hold circuit. The sample-and-hold circuit is coupled to the VS terminal to generate the voltage signal $V_X$ by sampling the voltage Vs correlated to the reflected voltage of the transformer 10. The switch 170 is controlled by the sample signal $S_V$. The switch 180 is controlled by the hold signal $S_P$. The capacitor 185 is utilized to generate the voltage signal $V_X$. The switch 170 is coupled to the transformer 10 through the VS terminal to sample the voltage Vs correlated to the reflected voltage of the transformer 10 into the capacitor 175. The switch 180 is coupled to the capacitor 175 to sample the voltage of the capacitor 175 into the capacitor 185 in response to the hold signal $S_P$. Therefore, the sample-and-hold circuit is coupled to the transformer 10 to generate a voltage signal $V_X$ by sampling the voltage Vs correlated to the reflected voltage of the transformer 10 in response to the sample signal $S_V$. The reflected voltage corresponds to the output voltage $V_O$ of the power converter. Therefore, the voltage signal $V_X$ is correlated to the output voltage $V_O$ of the power converter as shown in equations (1) and (2). The switching signal $S_W$ is further generated in response to the voltage signal $V_X$ for switching the transformer 10 and regulating the output of the power converter. Furthermore, the sampling circuit of the present invention includes a timing circuit 250 to generate a discharge-time signal $S_D$ representing the demagnetizing time of the transformer 10.

Figure 4:
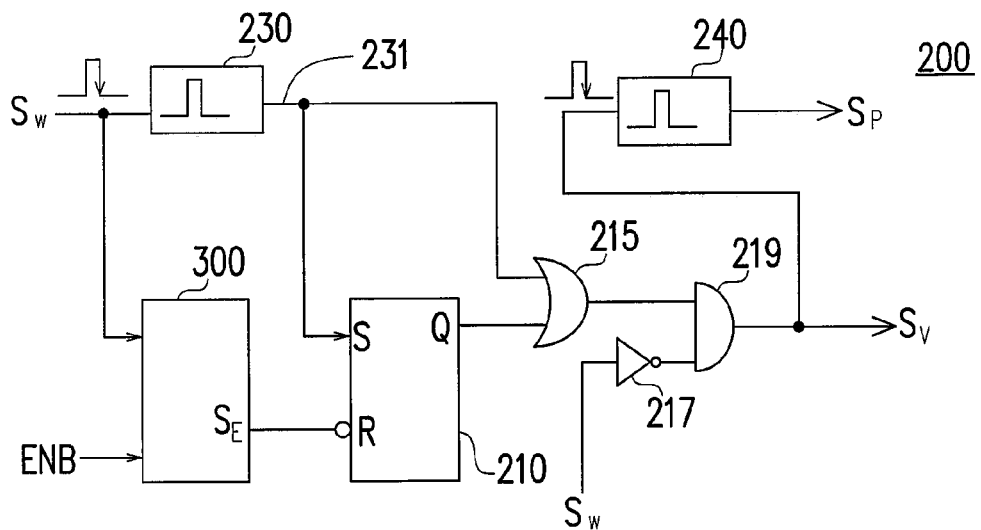
FIG. 4 shows a signal-generation circuit according to an embodiment of the present invention.

FIG. 4 schematically shows an embodiment of the signal-generation circuit 200. An one-shot circuit 230 is coupled to the switching signal $S_W$ to generate a first pulse signal 231 in response to the disable of the switching signal $S_W$. A signal-control circuit 300 receives the switching signal $S_W$ and the time-frame signal ENB to generate a reset signal $S_E$. An output circuit which includes a SR flip-flop 210, an OR gate 215, an inverter 217 and an AND gate 219 is coupled to the one-shot circuit 230 and the signal-control circuit 300 to generate the sample signal $S_V$. The first pulse signal 231 is connected to enable the SR flip-flop 210. The reset signal $S_E$ is connected to reset the SR flip-flop 210. The output of the SR flip-flop 210 is connected to an input of the OR gate 215. Another input of the OR gate 215 is connected to the first pulse signal 231. The output of the OR gate 215 is connected to an input of the AND gate 219. Another input of the AND gate 219 is connected to receive the switching signal $S_W$ through the inverter 217. The output of the AND gate 219 generates the sample signal $S_V$. Therefore, the sample signal $S_V$ is enabled in response to the first pulse signal 231. The sample signal $S_V$ is disabled in response to the reset signal $S_E$. The sample signal $S_V$ further includes a minimum pulse width that is generated in response to the disable of the switching signal $S_W$. The one-shot circuit 230 determines the pulse width of the minimum pulse width. Additionally, the signal-generation circuit 200 includes an one-shot circuit 240 coupled to receive the sample signal $S_W$ for generating a hold signal $S_P$ in response to the disable of the sample signal $S_W$.

Figure 5:
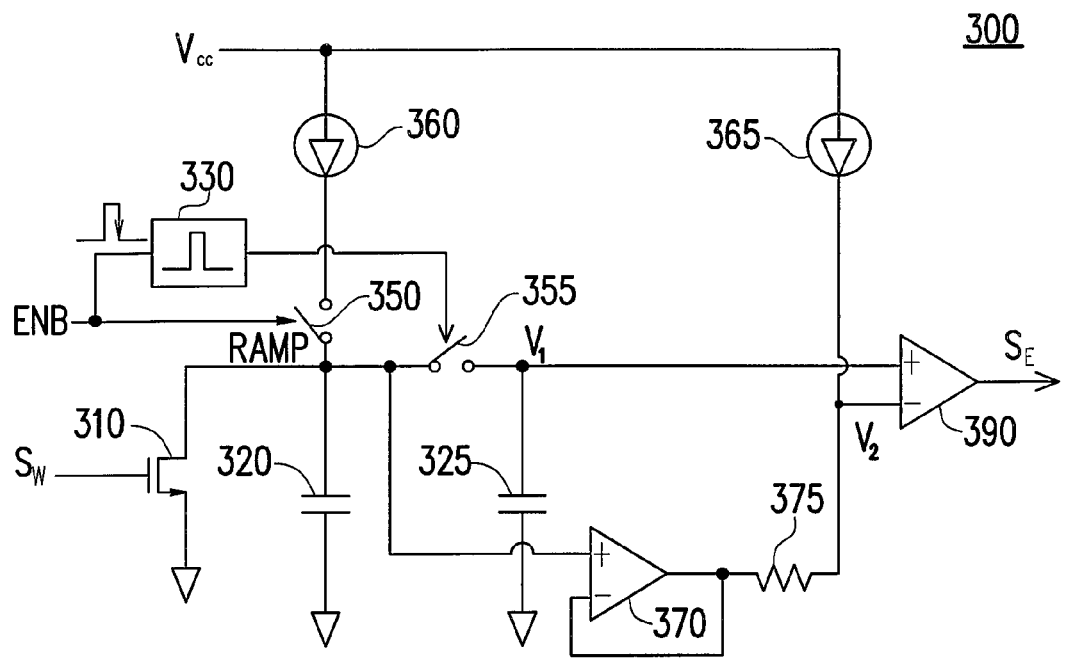
FIG. 5 shows a signal-control circuit according to an embodiment of the present invention.

FIG. 5 schematically shows an embodiment of the signal-control circuit 300. A capacitor 320 is used for generating a ramp signal RAMP. A current source 360 is utilized to charge the capacitor 320. A first switch 350 is coupled to the current source 360 and the capacitor 320 to enable charging the capacitor 320 in response to the time-frame signal ENB. Because the time-frame signal ENB is enabled in response to the demagnetizing of the transformer 10, the ramp signal RAMP is generated in response to the demagnetizing of the transformer. A transistor 310 is coupled to the capacitor 320 to enable the discharge of the capacitor 320 in response to the switching signal $S_W$. A capacitor 325 is used for generating a first reference signal V1. A second switch 355 is coupled to the capacitor 320 to sample the magnitude of the ramp signal RAMP into the capacitor 325 in response to the disabling state of the time-frame signal ENB. The time-frame signal ENB is coupled to control the second switch 355 through an one-shot circuit 330. Therefore, the first reference signal V1 is produced in accordance with the magnitude of the ramp signal RAMP once the transformer 10 is fully demagnetized. An operational amplifier 370, a resistor 375 and a current source 365 develop a buffer circuit. The current source 365 and the resistor 375 generate a bias signal ΔV due to a voltage drop on the resistor 375. The operational amplifier 370 is connected as a unit-gain buffer. The input of the operational amplifier 370 is connected to the capacitor 320. The output of the operational amplifier 370 is connected to the resistor 375 to generate a second reference signal V2, which is then connected to an input of a comparator 390. Therefore, the second reference signal V2 is generated in accordance with the ramp signal RAMP and the bias signal ΔV. Another input of the comparator 390 is connected to the capacitor 325 to receive the first reference signal V1. The output of the comparator 390 generates the reset signal $S_E$ when the second reference signal V2 is higher than the first reference signal V1. Therefore, the sample signal $S_V$ is disabled once the second reference signal V2 is higher than the first reference signal V1.

Figure 6:
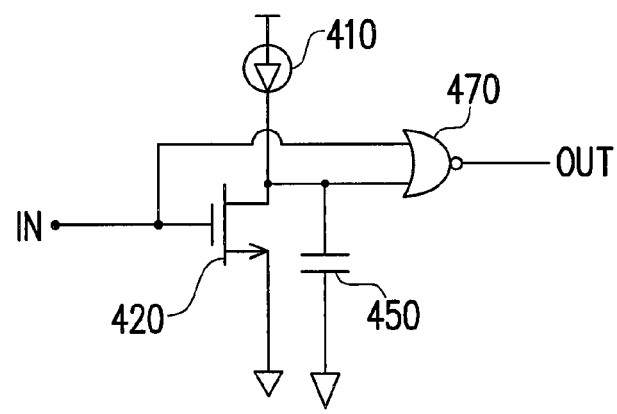
FIG. 6 shows the schematic of a one-shot circuit.

FIG. 6 shows the schematic view of the one-shot circuit such as one-shot circuits 230, 240 and 330 shown respectively in FIG. 4 and FIG. 5. A constant current source 410 is used to charge a capacitor 450 once a transistor 420 is turned off. The input terminal IN of the one-shot circuit 230, 240, and 330 is connected to the gate of the transistor 420 and the input of a NOR gate 470. Another input of the NOR gate 470 is connected to the capacitor 450. Therefore, the one-shot circuit generates an one-shot signal at the output of the NOR gate 470 in response to the falling edge of the input signal of the one-shot circuit. The current of the constant current source 410 and the capacitance of the capacitor 450 determine the pulse width of the one-shot signal.

Figure 7:
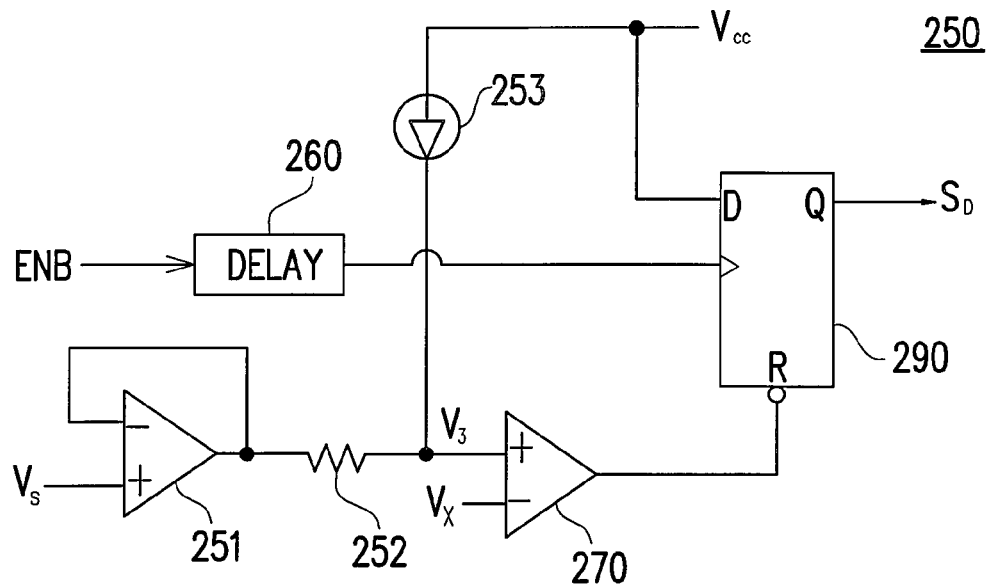
FIG. 7 shows a timing circuit according to an embodiment of the present invention.

FIG. 7 schematically shows the timing circuit 250 according to an embodiment of the present invention. An operational amplifier 251, a resistor 252, a current source 253 and a comparator 270 develop an input circuit. The operational amplifier 251, connected as a unit-gain buffer, is coupled to receive a voltage Vs in correlation with the reflect voltage $V_{AUX}$ of the transformer 10 through the VS terminal. The output of the operational amplifier 251 is connected to an input of the comparator 270 via the resistor 252. The current source 253 is connected to the resistor 252 to generate an offset signal at the resistor 252. The reflected voltage $V_{AUX}$ associated with the offset signal generates a third reference signal $V_3$ connected to the input of the comparator 270. Another input of the comparator 270 is connected to the voltage signal $V_X$. A flip-flop 290 and a delay circuit 260 form a latch circuit to generate the discharge-time signal $S_D$. The discharge-time signal $S_D$ represents the demagnetizing time of the transformer, and can be used to control the output current of the power converter. The time-frame signal ENB is connected to the clock input of the flip-flop 290 through the delay circuit 260 to enable the discharge-time signal $S_D$. The delay circuit 260 ensures that the flip-flop 290 can be set in response to the enabling state of the time-frame signal ENB after the reset signal of the flip-flop 290 is disabled. The output of the comparator 270 is connected to reset the flip-flop 290. The discharge-time signal $S_D$ is thus disabled when the third reference signal V3 is lower than the voltage signal $V_X$. Therefore, the discharge-time signal $S_D$ is enabled in response to the demagnetizing of the transformer 10. The discharge-time signal $S_D$ is disabled once the magnitude of the third reference signal V3 is lower than the voltage signal $V_X$.

Figure 8:
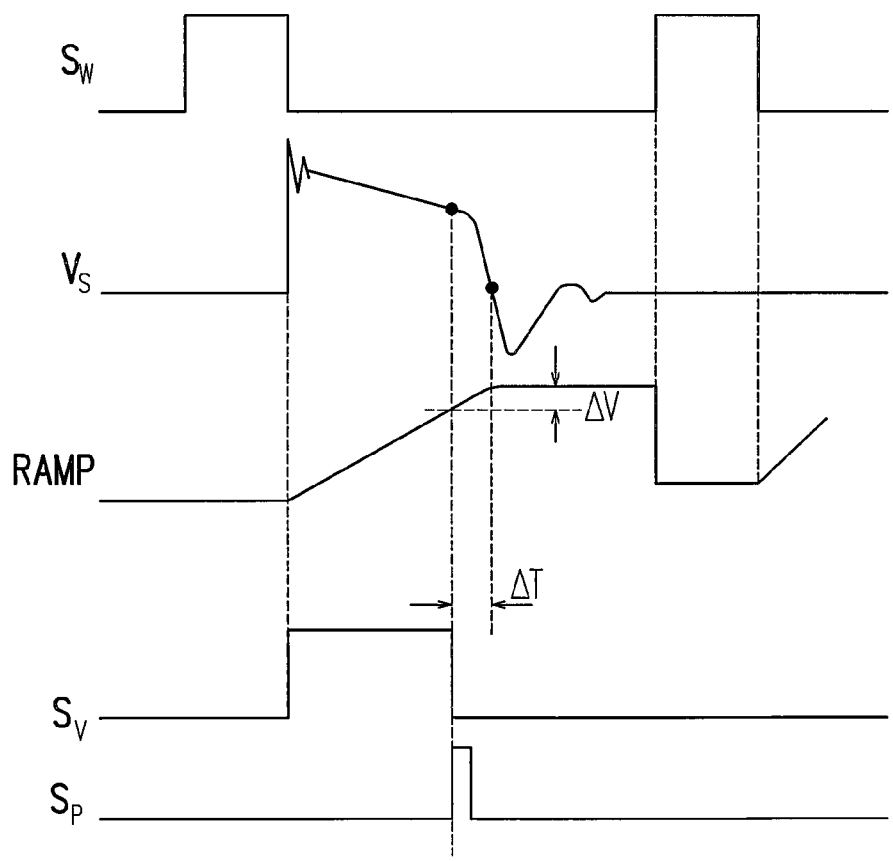
FIG. 8 shows the key waveforms of the sampling circuit in accordance with of the present invention.

FIG. 8 schematically shows the sample signal $S_V$ and the hold signal $S_P$ in response to the ramp signal RAMP on the capacitor 320 and waveform of the reflected voltage at the VS terminal. The bias signal ΔV provides a forward period ΔT to sample the reflected voltage before the transformer 10 is fully demagnetized. The forward period ΔT can be expressed as:

$$\Delta T = \frac{C_{320}}{I_{360}} \times \Delta V \qquad (3)$$

$$\Delta T = \frac{C_{320}}{I_{360}} \times I_{365} \times R_{375} \qquad (4)$$

where $C_{320}$ is the capacitance of the capacitor 320; $I_{360}$ is current of the current source 360; $I_{365}$ is current of the current source 365; $R_{375}$ is resistance of the resistor 375.

According to the embodiment of the present invention, a sampling circuit is provided to measure a reflected voltage of the transformer precisely. Furthermore, the configuration of the invention is also more simple over the prior art.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A sampling circuit of power converter, comprising:
   a signal-generation circuit, generating a sample signal for sampling a reflected voltage of a transformer; in which the signal-generation circuit generates a ramp signal in response to a demagnetizing of the transformer; a first reference signal is produced in accordance with a magnitude of the ramp signal once the transformer is fully demagnetized, and a second reference signal is generated in response to the ramp signal and a bias signal; and
   a sample-and-hold circuit, coupled to the transformer to generate a voltage signal by sampling the reflected voltage of the transformer in response to the sample signal,
   wherein the sample signal is enabled in response to the demagnetizing of the transformer; the sample signal is disabled once the second reference signal is higher than the first reference signal.

2. The sampling circuit as claimed in claim 1, further comprising a timing circuit to generate a discharge-time signal representing the demagnetizing of the transformer, wherein the discharge-time signal is enabled in response to the demagnetizing of the transformer; the discharge-time signal is disabled once a magnitude of a third reference signal is lower than a magnitude of the voltage signal; in which the third reference signal is correlated to the reflected voltage of the transformer and an offset signal.

3. The sampling circuit as claimed in claim 2, in which the timing circuit comprises:
   an input circuit, coupled to receive the reflect voltage of the transformer to generate the third reference signal in accordance with the reflected voltage of the transformer and the offset signal; and
   a latch circuit, for generating the discharge-time signal;
   wherein the discharge-time signal is enabled in response to the enable of the time-frame signal, and the discharge-time signal is disabled when the third reference signal is lower than the voltage signal.

4. The sampling circuit as claimed in claim 1, further comprising a comparison circuit to generate a time-frame signal in response to the reflected voltage of the transformer, wherein the time-frame signal is enabled in response to a disable of a switching signal; the time-frame signal is disabled when the reflected voltage of the transformer is lower than a threshold voltage; in which the switching signal is coupled to drive a power transistor of the power converter for switching the transformer; the enable of the switching signal represents the magnetizing of the transformer; the disable of the switching signal represents a start of demagnetizing the transformer.

5. The sampling circuit as claimed in claim 1, in which the signal-generation circuit comprises:
   a first one-shot circuit, coupled to the switching signal to generate a first pulse signal in response to the disable of the switching signal;
   a signal-control circuit, coupled to receive the switching signal and the time-frame signal to generate a reset signal; and
   an output circuit, coupled to the first one-shot circuit and the signal-control circuit to generate the sample signal;
   wherein the sample signal is enabled in response to the first pulse signal, and the sample signal is disabled in response to the reset signal.

6. The sampling circuit as claimed in claim 5, in which the signal-generation circuit further comprises:
   a second one-shot circuit, coupled to receive the sample signal for generating a hold signal in response to the disable of the sample signal.

7. The sampling circuit as claimed in claim 5, in which the signal-control circuit comprises:
   a first capacitor for generating the ramp signal;
   a current source;
   a first switch, coupled to the current source and the first capacitor to enable a charge of the first capacitor in response to the enable of the time-frame signal;
   a transistor, coupled to the first capacitor to enable a discharge of the first capacitor in response to the switching signal;
   a second capacitor, for generating the first reference signal;
   a second switch, coupled between the first capacitor and the second capacitor to sample a magnitude of the ramp signal into the second capacitor in response to the disable of the time-frame signal;
   a buffer circuit, including generating a bias signal, in which the buffer circuit is coupled to the first capacitor to generate the second reference signal in accordance with the ramp signal and the bias signal; and
   a first comparator, coupled to receive the first reference signal and the second reference signal to generate the reset signal when the second reference signal is higher than the first reference signal.

8. The sampling circuit as claimed in claim 1, in which the sample signal includes a minimum pulse width that is generated in response to the disable of the switching signal.

9. The sampling circuit as claimed in claim 1, in which the sample-and-hold circuit comprises:
   a third capacitor;
   a fourth capacitor for generating the voltage signal;
   a third switch for sampling the reflected voltage of the transformer into the third capacitor in response to the sample signal; and
   a fourth switch coupled to the third capacitor to sample the voltage of the third capacitor into the fourth capacitor in response to the hold signal.

10. A detection circuit of power converter, comprising:
    a comparison circuit, coupled to a transformer to generate a time-frame signal in response to a reflected voltage of a transformer, wherein the time-frame signal is disabled once the transformer is fully demagnetized;
    a signal-generation circuit, generating a sample signal for sampling the reflected voltage of the transformer, wherein the sample signal is enabled in response to a demagnetizing of the transformer; and the sample signal is disabled before the disable of the time-frame signal is set; and
    a sample-and-hold circuit, coupled to the transformer to generate a voltage signal by sampling the reflected voltage of the transformer in response to the sample signal;
    wherein the voltage signal is correlated to the output voltage of the power converter.

11. The detection circuit as claimed in claim 10, further comprising a timing circuit to generate a discharge-time signal representing the demagnetizing of the transformer, wherein the discharge-time signal is enabled in response to the demagnetizing of the transformer; and the discharge-time signal is disabled once the reflected voltage of the transformer is lower than the voltage signal.

12. The detection circuit as claimed in claim 10, in which the sample-and-hold circuit comprises:
    a sample capacitor;
    a hold capacitor for generating the voltage signal;
    a sample switch for sampling the reflected voltage of the transformer into the sample capacitor in response to the sample signal; and
    a hold switch coupled to the sample capacitor to sample the voltage of the sample capacitor into the hold capacitor after the disabling state of the sample signal.

* * * * *